US011992832B2

(12) United States Patent
Kaneko et al.

(10) Patent No.: US 11,992,832 B2
(45) Date of Patent: May 28, 2024

(54) SAFETY CABINET

(71) Applicant: Hitachi Industrial Equipment Systems Co., Ltd., Tokyo (JP)

(72) Inventors: Takeshi Kaneko, Tainai (JP); Takeshi Matsumura, Tainai (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 477 days.

(21) Appl. No.: 17/345,750

(22) Filed: Jun. 11, 2021

(65) Prior Publication Data

US 2022/0097036 A1 Mar. 31, 2022

(30) Foreign Application Priority Data

Sep. 28, 2020 (JP) ................................ 2020-161661

(51) Int. Cl.
*B01L 1/04* (2006.01)
*F24F 8/108* (2021.01)

(52) U.S. Cl.
CPC ................ *B01L 1/04* (2013.01); *F24F 8/108* (2021.01); *B01L 2200/0631* (2013.01); *B01L 2200/0684* (2013.01); *B01L 2300/04* (2013.01)

(58) Field of Classification Search
None
See application file for complete search history.

(56) References Cited

U.S. PATENT DOCUMENTS

2012/0019110 A1* 1/2012 Ono ......................... B25J 21/02 312/1
2020/0149762 A1 5/2020 Ono et al.

FOREIGN PATENT DOCUMENTS

| | | | | |
|---|---|---|---|---|
| CN | 111315484 | A | 6/2020 | |
| JP | 57-123637 | U | 8/1982 | |
| JP | 59-193142 | U | 12/1984 | |
| JP | 1-151839 | U | 10/1989 | |
| JP | 2012-24657 | A | 2/2012 | |
| JP | 2013-230423 | * | 11/2013 | ................ B01L 1/00 |
| JP | 2013-230423 | A | 11/2013 | |
| JP | 2019-74237 | A | 5/2019 | |
| JP | 2020-966 | * | 1/2020 | ................ B01L 1/00 |
| JP | 2020-966 | A | 1/2020 | |

OTHER PUBLICATIONS

Korean-language Office Action issued in Korean Application No. 10-2021-0077287 dated Mar. 6, 2023 with English translation (12 pages).
Chinese-language Office Action issued in Chinese Application No. 202110642877.0 dated Apr. 27, 2023 (10 pages).
Japanese-language Office Action issued in Japanese Application No. 2020-161661 dated Jun. 27, 2023 with English translation (7 pages).

* cited by examiner

*Primary Examiner* — Jason M Greene
(74) *Attorney, Agent, or Firm* — Crowell & Moring LLP

(57) ABSTRACT

A safety cabinet that includes an opening portion in a front surface of a work space and a front shutter, and supplies purified air into the work space from above. The front shutter slides in an upward and downward direction to close a part or an entirety of the opening portion. The front shutter includes a small window shutter that slides in a lateral direction.

10 Claims, 6 Drawing Sheets

SAFETY CABINET

BACKGROUND OF THE INVENTION

1. Field of the Invention

The present invention relates to a safety cabinet that is used for medicine development or research on pathogens or the like.

2. Description of the Related Art

A safety cabinet is used when pathogens or the like are handled in research on pathogens such as viruses, in medicine development such as vaccine development, or the like.

As one example of the safety cabinet, JP 2019-74237 A discloses a safety cabinet in which a blowout HEPA filter is provided in an upper portion of a work space, a front shutter which is openable and closable is provided in a front portion of the work space, a rear grille is provided on a lower rear side, a front grille is provided on a lower front side, and air is uniformly supplied from the blowout HEPA filter to the work space, and air is suctioned from the front grille and the rear grille of a workbench forming a bottom surface of the work space to cause the air to uniformly flow downward from above, thereby purifying the work space.

When the safety cabinet is used, pathogens or the like are handled in the work space, so that the pathogens or the like can be prevented from being contaminated and the pathogens or the like can be prevented from leaking from inside the work space to a worker side.

In the safety cabinet disclosed in JP 2019-74237 A, a worker sits in front of the safety cabinet, and inserts the arms into the work space from a work opening portion below the front shutter to perform work, but it is not considered that the worker performs work in a plurality of postures such as a sitting posture and a standing posture.

SUMMARY OF THE INVENTION

An object of the present invention is to provide a safety cabinet that allows a worker to perform work in either of a sitting posture and a standing posture.

In order to solve the above problem, as one example of a "safety cabinet" of the present invention, there is provided a safety cabinet that includes an opening portion in a front surface of a work space and a front shutter, and supplies purified air into the work space from above. The front shutter slides in an upward and downward direction to close a part or an entirety of the opening portion. The front shutter includes a small window shutter that slides in a lateral direction.

In addition, as another example of a "safety cabinet" of the present invention, there is provided a safety cabinet that includes an opening portion in a front surface of a work space and a front shutter, and supplies purified air into the work space from above. The front shutter slides in an upward and downward direction to close a part or an entirety of the opening portion. The front shutter includes a small window shutter that slides in a lateral direction. Dual air barriers are provided in a flow path in which an air barrier is formed by normal air that has flowed in from an upper portion of the front shutter, and a flow path in which an air barrier is formed by the purified air.

According to the present invention, since a front shutter is provided with a small window shutter that slides in a lateral direction, it is possible to provide a safety cabinet that allows a worker to perform work in either of a sitting posture and a standing posture.

In addition, owing to dual air barriers, namely, an air barrier by normal air and an air barrier by purified air, when a small window shutter is provided, it is possible to secure the purity over a wide range in a work space.

Tasks, configurations, and effects other than those described above are apparent from the description of the following embodiments.

DETAILED DESCRIPTION OF THE PREFERRED EMBODIMENTS

Figure 6B:
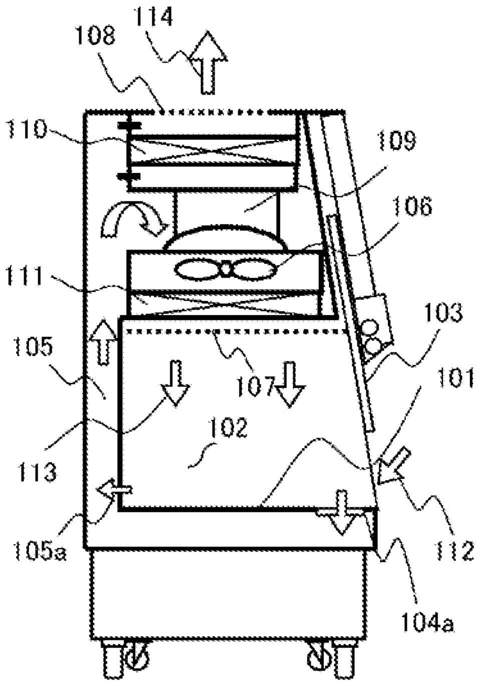
FIG. 6B is a schematic side view of one example of the normal safety cabinet.
Figure 6A:
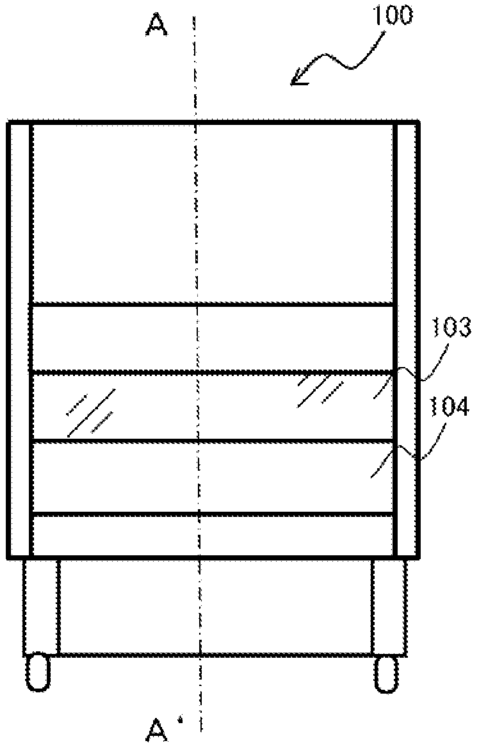
FIG. 6A is a schematic front view of one example of a normal safety cabinet.

Before embodiments of the present invention are described, a normal safety cabinet will be described. FIG. 6A illustrates a schematic front view of the safety cabinet, and FIG. 6B illustrates a schematic side view of the safety cabinet when an A-A' cross section in FIG. 6A is viewed from the left.

A work space 102 of which the front surface is formed of a front shutter 103, is disposed inside a safety cabinet 100. A lower surface of the work space 102 is formed of a workbench surface 101, and a front slit **104*a* is disposed on a front shutter 103 side of the workbench surface 101. A work opening portion 104 is formed below the front shutter 103. When a safety cabinet fan 106 is operated, a pressure chamber 109 is pressurized. A blowout HEPA filter 111 is connected to the pressure chamber 109, and after dust in the pressure chamber 109 is filtered with the blowout HEPA filter 111, and the purified air is blown out and then rectified by a blowout rectification plate 107, the purified air is supplied into the work space 102 as a blowout airflow 113**.

An exhaust HEPA filter 110 is also connected to the pressure chamber 109. The air pressurized in the pressure chamber 109 is filtered with the exhaust HEPA filter 110 to be exhausted from the safety cabinet 100 through a safety cabinet exhaust port 108 as exhaust air 114. The same amount of air as that of the air exhausted from the safety cabinet 100 enters the safety cabinet 100. The air is an inlet airflow 112 that is generated in the work opening portion 104 below the front shutter 103. The inlet airflow 112 is suctioned into the front slit **104*a*, together with a part of the blowout airflow 113 of the work space 102. The air is suctioned through a region under the workbench surface 101, together with a part of the blowout airflow 113 from a rear slit 105***a* formed on an opposite surface of the work space 102 from the front shutter 103, and is suctioned to the safety cabinet fan 106 through a back flow path 105.

Since dust and aerosols containing pathogens or the like are handled in the work space 102, dust and aerosols containing pathogens or the like are also present in the back flow path 105 and the pressure chamber 109. When air is supplied to the work space 102 and when air is exhausted from the safety cabinet 100, the dust and the aerosols are removed with the blowout HEPA filter 111 and the exhaust HEPA filter 110.

A worker sits in front of the safety cabinet 100, and inserts the arms into the work space 102 from the work opening portion 104 to perform work while seeing the work space 102 through the front shutter 103.

In such a safety cabinet, the worker is not limited to performing work in a sitting posture, and may desire to perform work in a standing posture. In addition, a plurality of two or more workers may perform work at the same time.

The present invention provides a safety cabinet that allows a worker to perform work in either of a sitting posture and a standing posture. In addition, there is provided a safety cabinet that can be used at the same time by two or more workers. In addition, in such a safety cabinet, dual air barriers are formed to secure the purity over a wide range in the work space.

Hereinbelow, embodiments of the present invention will be described with reference to the drawings. Incidentally, in each drawing for describing the embodiments, the same names and reference signs will be assigned to the same components, and repeated descriptions thereof will be omitted.

First Embodiment

FIGS. 1A to 3B illustrate a safety cabinet of a first embodiment of the present invention. The safety cabinet of the first embodiment is a safety cabinet for two people, which allows two workers to perform work at the same time, and the lateral width of a work window is, for example, 1,900 mm. Similar to the normal safety cabinet of FIGS. 6A and 6B, the safety cabinet includes a safety cabinet housing 10 including a work space 12, and a front shutter 20 that is provided on a front surface side of the work space 12 to slide in an upward and downward direction.

Three small window shutters 22 which slide in a lateral direction are provided in a substantially central portion in the upward and downward direction of the front shutter 20. In the example of the drawings, all the three small window shutters 22 are slidable, but the small window shutter at the center may be fixed, and the small window shutters on both right and left sides may be slidable rightward and leftward. The small window shutter 22 has such a size that a worker inserts both right and left arms from the small window shutter to perform work in the work space when the small window shutter 22 slides open.

Fixed windows 24 are provided above and below the small window shutters 22. The small window shutter 22 or the fixed window 24 is made of glass or hard plastic.

Figure 1A:
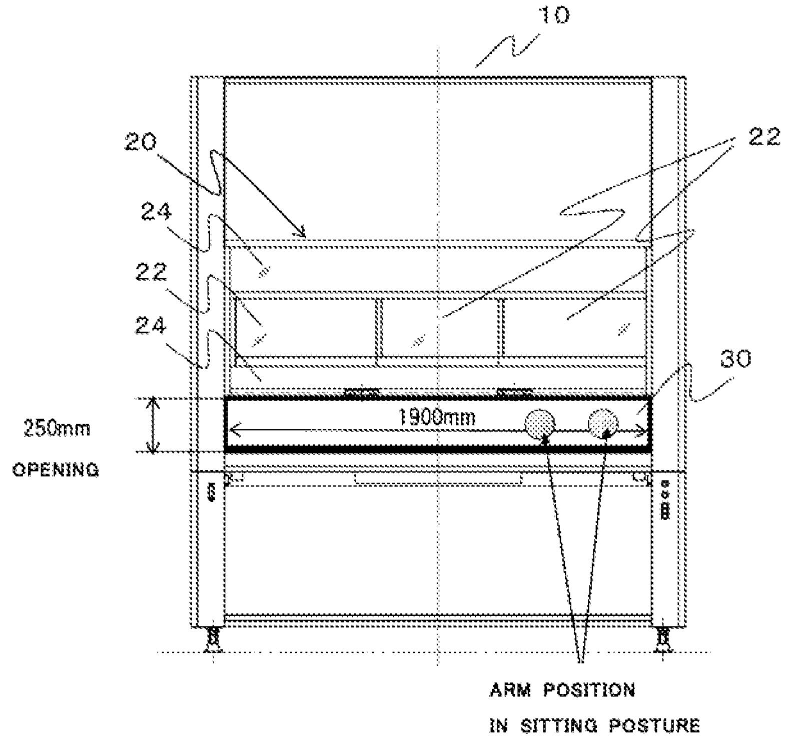
FIG. 1A is a front view illustrating a usage example of a safety cabinet of a first embodiment.
Figure 1B:
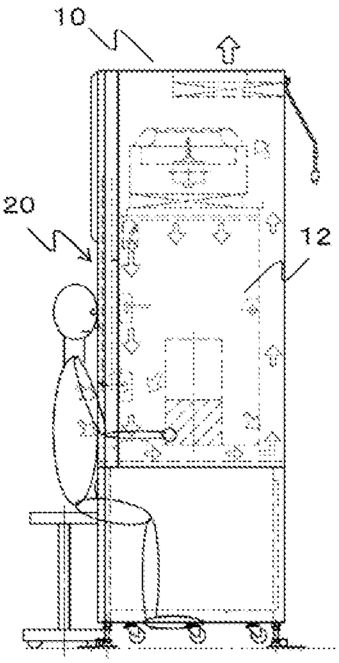
FIG. 1B is a side view illustrating the usage example of the safety cabinet of the first embodiment.

FIGS. 1A and 1B illustrate a usage example in which the front shutter 20 is lifted to form an opening window 30 having a vertical width of 250 mm below the front shutter 20. In this case, a tall worker having, for example, a height of 180 cm can insert both arms from the opening window 30 to perform work in the work space in a sitting posture. All the small window shutters 22 are closed.

Figure 2A:
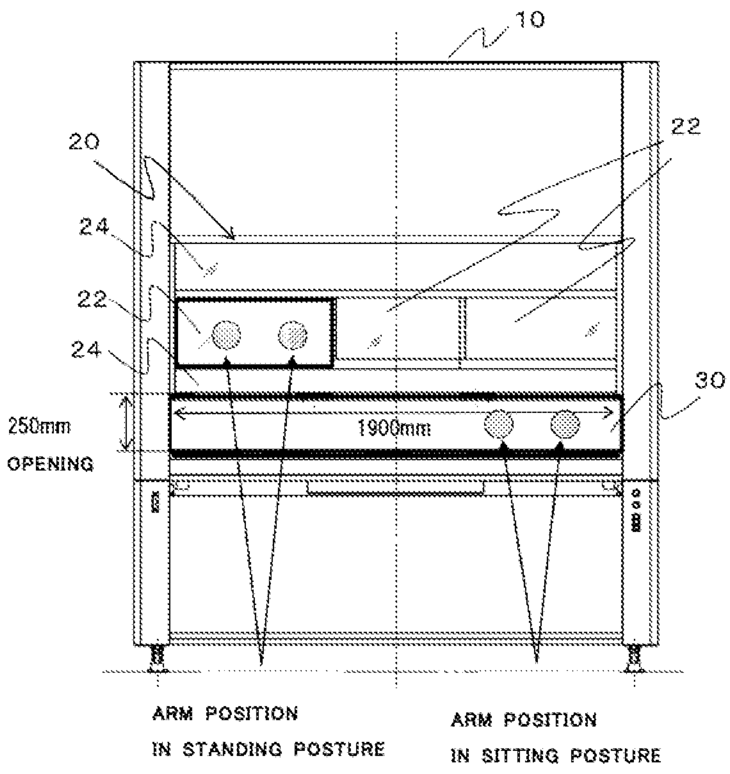
FIG. 2A is a front view illustrating another usage example of the safety cabinet of the first embodiment.
Figure 2B:
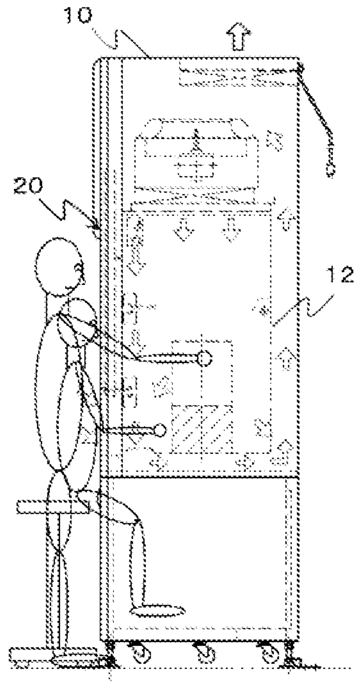
FIG. 2B is a side view illustrating the another usage example of the safety cabinet of the first embodiment.

FIGS. 2A and 2B also illustrate a usage example in which the front shutter 20 is lifted to form the opening window 30 having a vertical width of 250 mm below the front shutter 20. The small window shutter 22 on the left is slid open. In this case, a tall worker having, for example, a height of 180 cm can insert both arms from the small window shutter 22 on the left to perform work in the work space in a standing posture on a left side of the safety cabinet. In addition, a short worker having, for example, a height of 150 cm can insert both arms from the opening window 30 to perform work in the work space in a sitting posture on a right side of the safety cabinet. Incidentally, in FIGS. 1A, 1B, 2A, and 2B, the heights of the tall worker and the short worker in a sitting posture may be adjusted by adjusting the heights of chairs.

Figure 3A:
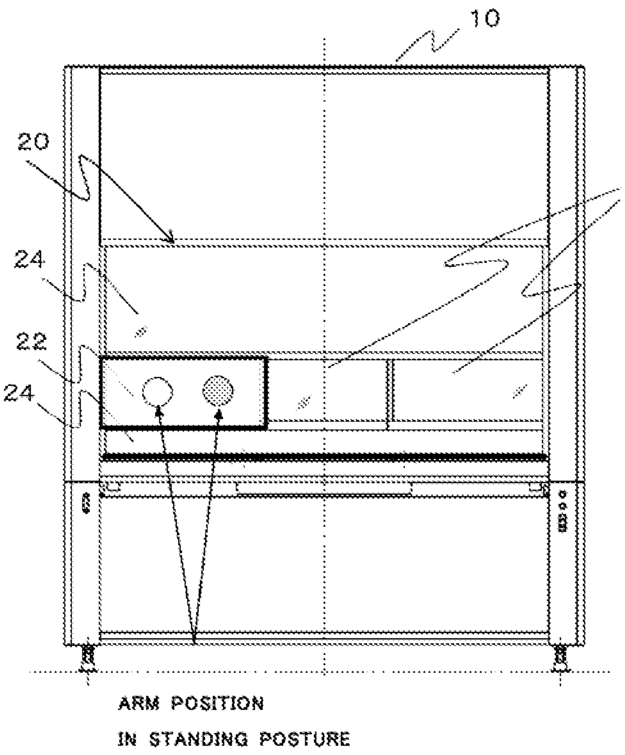
FIG. 3A is a front view illustrating another usage example of the safety cabinet of the first embodiment.
Figure 3B:
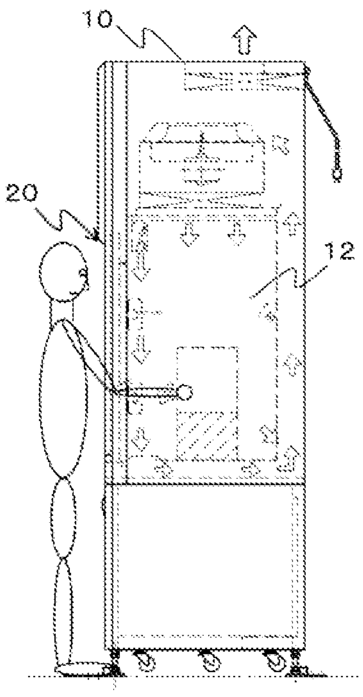
FIG. 3B is a side view illustrating the another usage example of the safety cabinet of the first embodiment.

FIGS. 3A and 3B illustrate a usage example in which the front shutter 20 slides downward to fully close the opening window 30 and the small window shutter 22 on the left is slid open. In this case, a worker can insert both arms from the small window shutter 22 to perform work in the work space in a standing posture.

Incidentally, instead of fully closing the opening window 30 by the front shutter 20 as in FIGS. 3A and 3B, the position of the front shutter 20 may be adjusted by sliding in an upward direction, and then the front shutter may be stationary at a position determined in advance at which performance is guaranteed. When the small window shutter 22 is disposed at a height corresponding to the height of a worker, both a tall worker and a short worker can perform work in a standing posture at heights appropriate for facilitating performing the work.

The present invention is not limited to the usage examples of FIGS. 1A to 3B, and according to the safety cabinet of the present embodiment, two workers can also perform work together in a standing posture or together in a sitting posture.

Also in a safety cabinet for one people, since the front shutter is provided with the small window shutter that slides in the lateral direction, a worker can perform work in either of a sitting posture and a standing posture. In addition, the present invention can also be applied to a safety cabinet for three or more people.

According to the present embodiment, in the safety cabinet that allows two or more workers to perform work, since the front shutter which slides in the upward and downward direction is provided with the small window shutters that slide in the lateral direction, a worker can perform work in either of a sitting posture and a standing posture, and both a tall worker and a short worker can perform work at positons appropriate for facilitating performing the work. In addition, according to the safety cabinet of the present embodiment, two or more workers can perform work at the same time.

Further, since the small window shutter 22 is adopted which slides in the lateral direction, it is possible to suppress the turbulence of an airflow during opening and closing of the small window shutter, and it is possible to prevent contamination.

Second Embodiment

A safety cabinet in a second embodiment of the present invention is such that in the safety cabinet of the first embodiment in which the front shutter includes the small window shutters, when the front shutter is closed, dual air barriers are provided to maintain the purity in the work space. In the safety cabinet, air which is purified by filtering dust with a HEPA filter 16 is supplied into the work space 12 as a blowout airflow by a fan 15. The blowout airflow flows on a back side of the front shutter 20, and the air speed of an airflow flowing along the back side of the front shutter 20 is increased due to the Coanda effect by the front shutter 20. When a worker opens the small window shutter 22, and inserts the arms into the work space, the airflow at a high speed hits the arms to cause turbulence in the airflow, so that the purity in the work space is not maintained. In addition, even when the arms are not inserted, the opening and closing of the small window shutter 22 causes turbulence in the airflow. In the present embodiment, in the safety cabinet including the small window shutter 22, the air barriers equivalent to a safety cabinet are provided.

Figure 4:
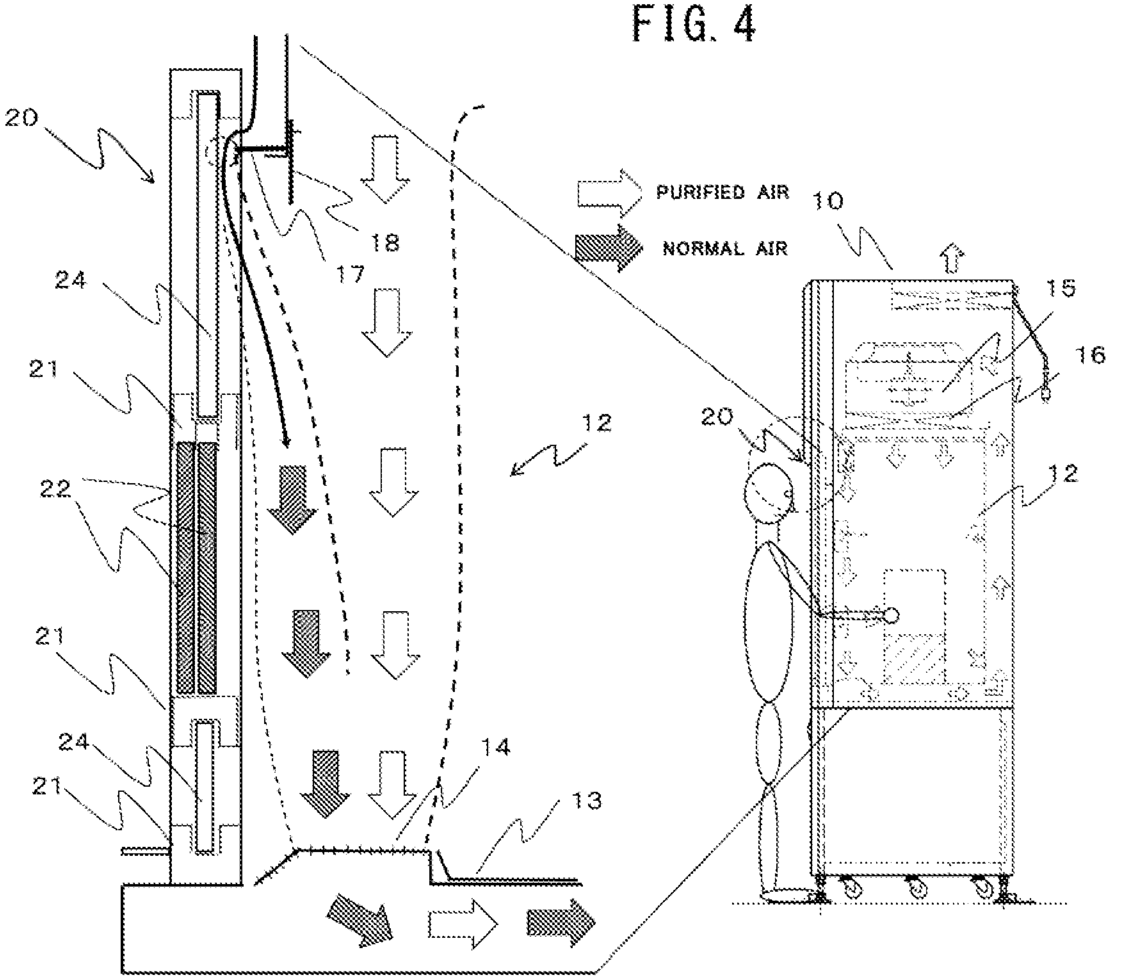
FIG. 4 is a view illustrating a state where a front shutter is closed in a safety cabinet of a second embodiment.

FIG. 4 illustrates one example of the safety cabinet of the second embodiment of the present invention, the right side in FIG. 4 illustrates a right side view, and the left side in FIG. 4 illustrates an enlarged view of a front shutter portion. FIG. 4 is a view in which the front shutter is closed and a worker performs work in a standing posture.

As illustrated in the drawings, the front shutter 20 includes the small window shutter 22, which is a slide type small window, in a substantially central portion in the upward and downward direction, and includes the fixed windows 24 above and below the small window shutter 22. The small window shutter 22 and the fixed windows 24 are supported by a shutter frame 21.

A gap closing member formed of a rubber plate 17 is attached in a place that is located in an upper portion of the work space and faces the front shutter 20 of the housing 10.

As illustrated in the drawings, in a state where the front shutter 20 is closed, a gap is formed between the rubber plate 17 and the fixed window 24, and as illustrated by a solid arrow, normal air outside the safety cabinet flows into the work space 12 through the gap. The normal air which has flowed in flows on the back side of the front shutter to be suctioned into a slit 14 on a lower side. Meanwhile, as illustrated by white arrows, the purified air which has passed through the HEPA filter 16 flows downward on a side closer to a work section than the normal air, and then is suctioned into the slit 14 on the lower side. Since the air speed of the normal air flowing in from the gap between the rubber plate 17 and the fixed window 24 is low, even when the small window shutter 22 is opened and closed or even when a worker inserts the arms from the small window shutter 22, the turbulence of the airflow in the work section is small. The purity in the work space can be maintained by the dual air barriers formed by the normal air which has flowed in from outside and the purified air which has passed through the HEPA filter.

Since the safety cabinet has a structure in which a pressure difference between the inside and the outside of the small window shutter 22 is reduced by the flow of the normal air which has flowed in from outside the safety cabinet, and the small window shutter 22 is adopted which slides in the lateral direction, it is possible to suppress the turbulence of the airflow during opening and closing of the small window shutter, and it is possible to prevent contamination.

A rectification plate 18 which is a rising portion extending downward is provided in the housing at the position of a front upper portion of the work space 12. Since the normal air which has flowed in from outside and the purified air are separated from each other in the front upper portion of the work space 12 by the rectification plate 18, it is possible to suppress the mixing of the normal air and the purified air.

In order to confirm the flow of air in the state of FIG. 4, when smoke was introduced from outside an upper portion of a front opening portion, and the flow of the smoke was observed, it was confirmed that normal air from outside flowed downward to be suctioned into the slit, thereby forming an air barrier. In addition, when smoke was introduced from inside the upper portion of the front opening portion, and the flow of the smoke was observed, it was confirmed that the purified air of the work space flowed downward to be suctioned into the slit, thereby forming an air barrier.

Figure 5:
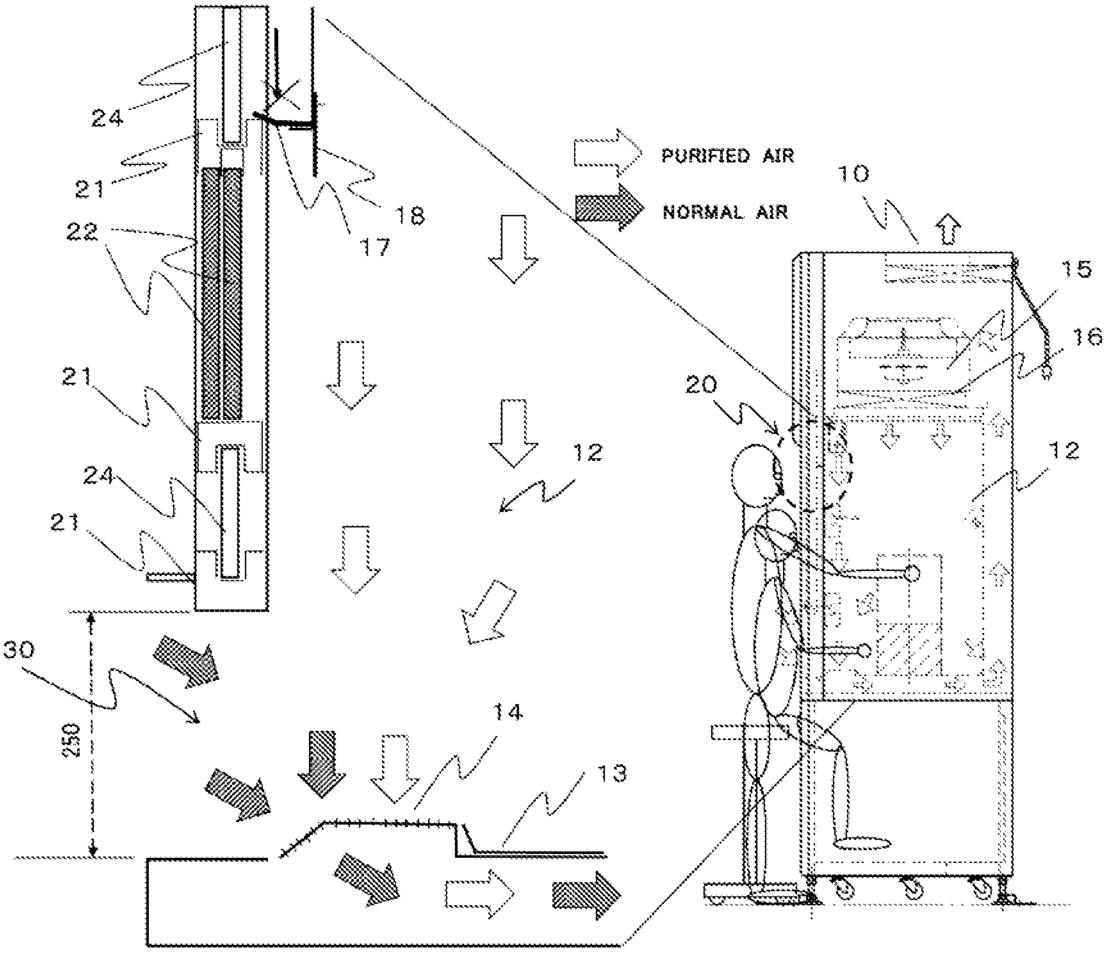
FIG. 5 is a view illustrating a state where the front shutter is opened in the safety cabinet of the second embodiment.

FIG. 5 is a view illustrating a state where the front shutter 20 is slid upward, and the front shutter 20 is opened. When the front shutter 20 slides upward, a part of the shutter frame 21 comes into contact with the rubber plate 17, and the gap is closed, so that normal air does not flow in from outside.

In this case, in the operation of the safety cabinet, normal outside air flows in from a front opening portion to be suctioned into the slit 14. In addition, as illustrated by white arrows, the purified air which has passed through the HEPA filter 16 flows downward to be suctioned into the slit 14 on the lower side.

According to the present embodiment, in the safety cabinet in which the front shutter includes the small window shutter, owing to the dual air barriers formed by the normal air from outside and the purified air, even when the small window shutter is opened, it is possible to secure the purity over a wide range in the work section. In addition, when the small window shutter is opened and closed, or when a worker inserts the arms into the work space to perform work, it is possible to suppress the turbulence of the airflow, and it is possible to suppress contamination.

What is claimed is:

1. A safety cabinet that includes an opening portion in a front surface of a work space and a front shutter that slides in an upward and downward direction to close a part or an entirety of the opening portion, and supplies purified air through a HEPA filter into the work space from above and sucks air from front and rear slits below the work space,
wherein
the front shutter includes a small window shutter that opens by sliding in a lateral direction in a substantially central portion in the upward and downward direction, and
a worker can work by inserting arms into the work space from below the front shutter to perform work in a sitting posture, and the worker can work by directly inserting arms into the work space through an opening by sliding the small window shutter to perform work in a standing posture.

2. The safety cabinet according to claim 1,
wherein when the small window shutter slides in the lateral direction to be opened, a worker can insert both arms to perform work.

3. The safety cabinet according to claim 1,
wherein the safety cabinet has such a width that two or more workers can perform work, and
a plurality of the small window shutters are provided in the lateral direction.

4. The safety cabinet according to claim 1,
wherein the front shutter includes fixed windows above and below the small window shutter.

5. The safety cabinet according to claim 1,
wherein when the front shutter is opened, a worker can insert arms from below the front shutter to perform work in a sitting posture, and a worker can insert arms from the small window shutter to perform work in a standing posture.

6. The safety cabinet according to claim 1,
wherein the front shutter is closed, a worker can insert arms from the small window shutter to perform work in a standing posture.

7. The safety cabinet according to claim 1,
wherein when the front shutter is closed, dual air barriers are provided in a flow path in which an air barrier is formed by normal air that has flowed in from outside through the gap between a casing and an upper portion of the front shutter, and a flow path in which an air barrier is formed by the purified air.

8. The safety cabinet according to claim 7,
wherein a gap closing member is provided which forms a gap between a fixed window of the front shutter and the gap closing member when the front shutter is closed, and closes the gap with a shutter frame of the front shutter when the front shutter is opened.

9. The safety cabinet according to claim 7,
wherein a slit that suctions the normal air which has flowed in and the purified air is provided in a lower front portion of the work space.

10. The safety cabinet according to claim 7,
A rectification plate extending downward is provided in a housing at a position of a front upper portion of the work space.

* * * * *